United States Patent

Smolik

[11] 4,229,614
[45] Oct. 21, 1980

[54] ELECTRICAL RECEPTABLE BOX AND METHOD OF INSTALLATION

[76] Inventor: Robert A. Smolik, 670 W. Seventh St., St. Paul, Minn. 55102

[21] Appl. No.: 18,144

[22] Filed: Mar. 7, 1979

[51] Int. Cl.³ .............................................. H02G 3/10
[52] U.S. Cl. ....................................... 174/58; 174/48; 174/65 R; 144/144 R; 144/323
[58] Field of Search .................. 174/53, 58, 57, 65 R, 174/48; 220/3.2–3.94; 248/231.1, DIG. 6; 144/144 R, 323

[56] References Cited

U.S. PATENT DOCUMENTS

| | | |
|---|---|---|
| 1,971,908 | 8/1934 | Fullman ........................... 220/3.94 |
| 2,016,284 | 10/1935 | Knight . |
| 2,035,657 | 3/1936 | Kottemann . |
| 2,562,344 | 7/1951 | Tranas ............................. 220/3.9 |
| 2,738,892 | 3/1956 | Wiesmann . |
| 2,759,621 | 8/1956 | Hamilton et al. . |
| 2,961,480 | 11/1960 | Murray . |
| 2,968,689 | 1/1961 | Johnson . |
| 3,047,650 | 7/1962 | Reiland . |
| 3,395,243 | 7/1968 | Kelly . |
| 3,598,897 | 8/1971 | Castic . |
| 3,639,677 | 2/1972 | Bain ............................. 174/65 R X |
| 3,878,315 | 4/1975 | Blush . |

Primary Examiner—B. A. Reynolds
Assistant Examiner—D. A. Tone
Attorney, Agent, or Firm—Burd, Bartz & Gutenkauf

[57] ABSTRACT

An electrical receptacle box mountable to a vertical upright wall stud and a method of installation thereof. A receptacle box housing has an open front and a hollow tubular mounting stem extended from one side wall thereof. The mounting stem is adapted to be inserted through a hole formed in the wall stud with the outer end extended through the opposite side of the wall stud. A coupler is secured to the outer end to secure the housing to the wall stud. A plurality of ears are located in the housing recessed with respect to the front opening to receive feet of a mounting ring for mounting electrical receptacles. The ears are recessed so that a hole can be formed in wallboard installed over the receptacle housing in substantial conformance to the front opening of the housing.

10 Claims, 12 Drawing Figures

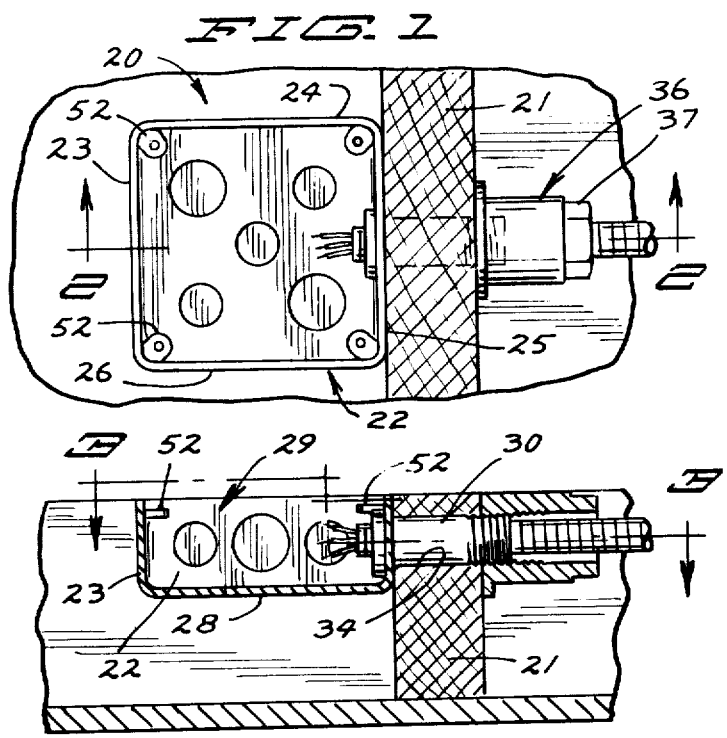
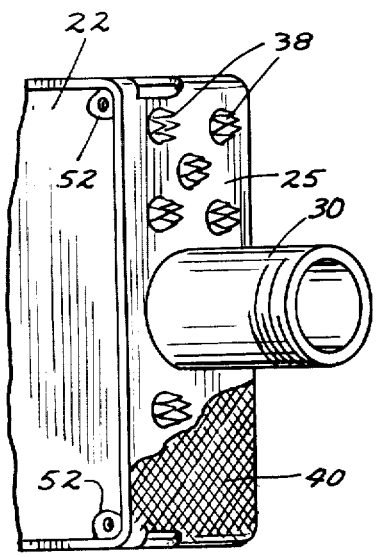
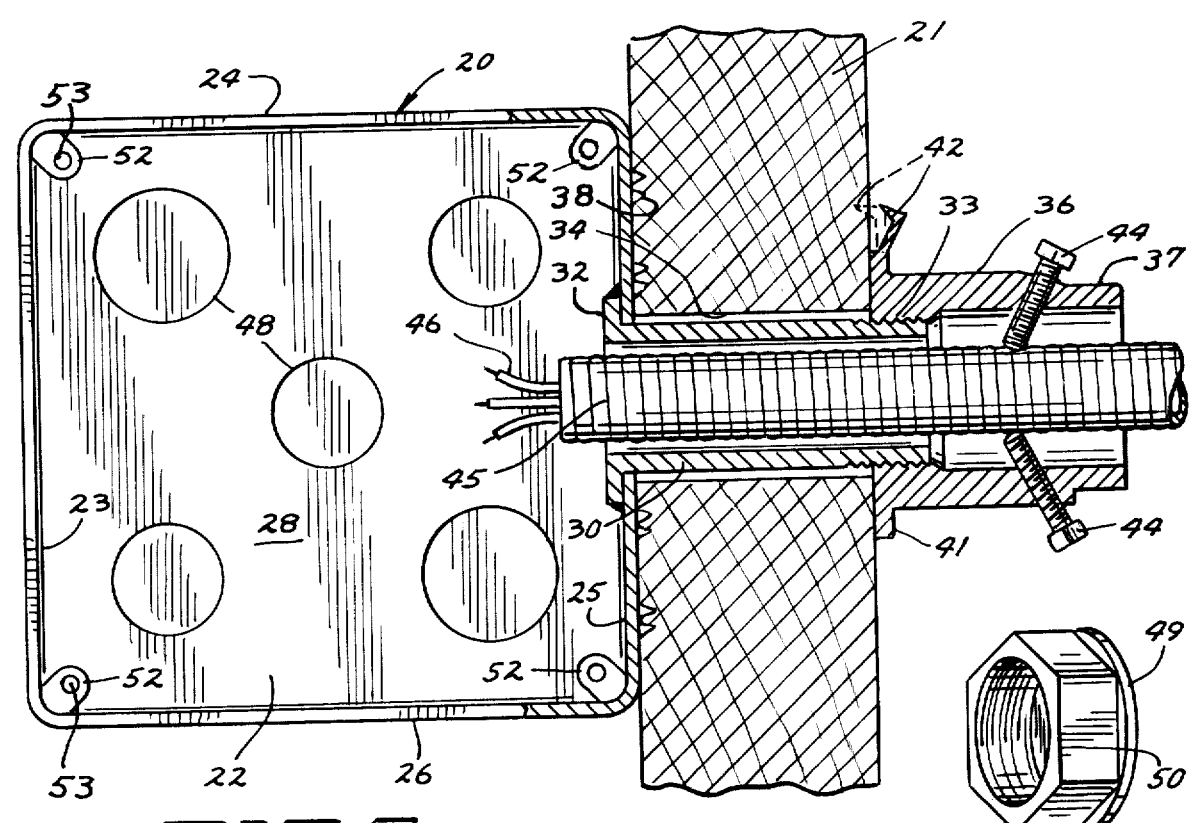

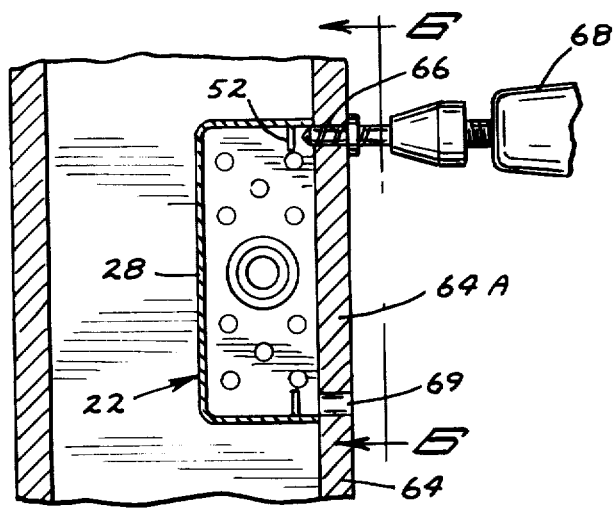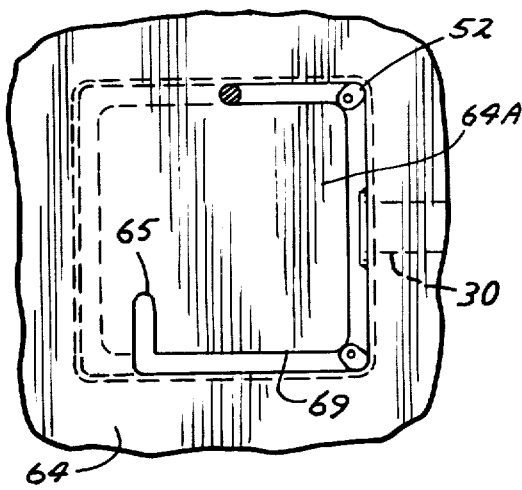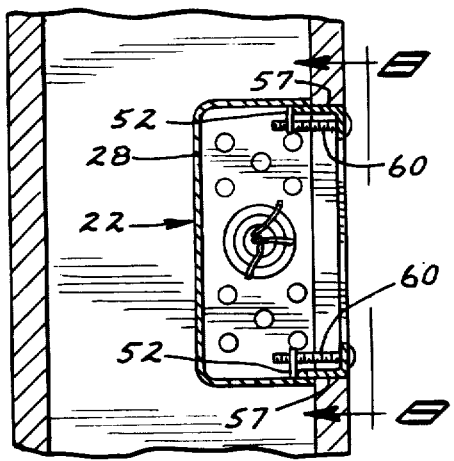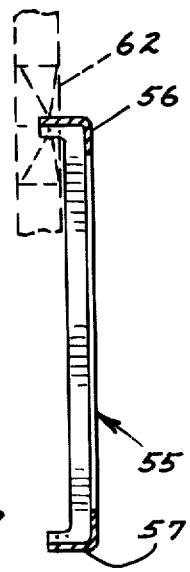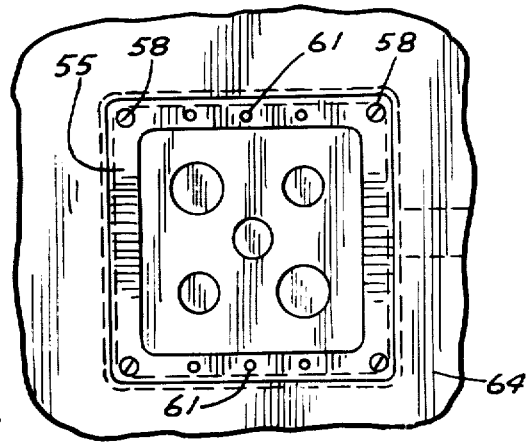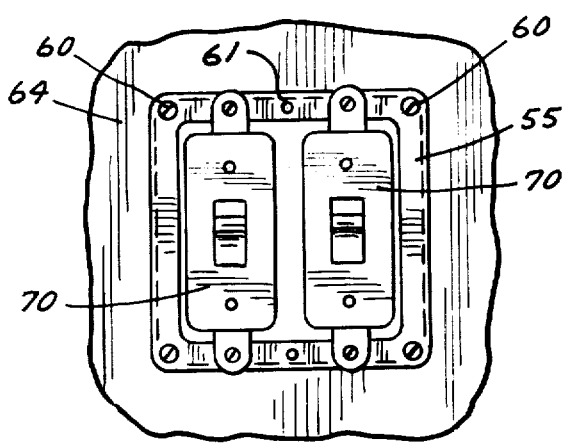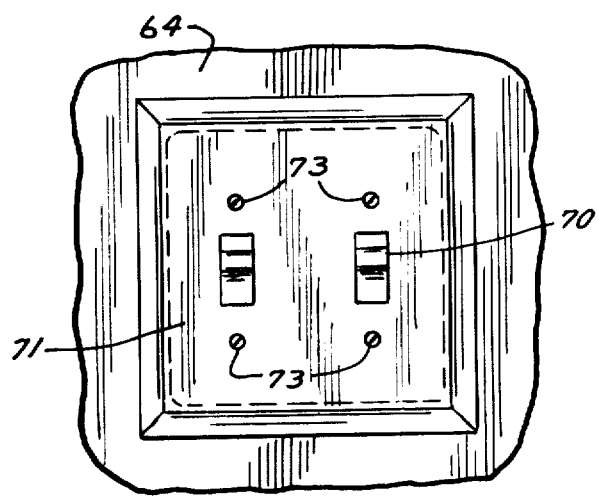

ELECTRICAL RECEPTABLE BOX AND METHOD OF INSTALLATION

SUMMARY OF THE INVENTION

The invention relates to an electrical receptacle box of the type to hold an electrical receptacle such as an outlet or a switch or the like, and a method of mounting the box on a wall stud. In the prior art, a common method by which an electrical receptacle box is mounted on a wall stud is simply by nailing or screwing it to the stud and then, if necessary, adding a support clamp between the mounting stud and the next adjacent stud. Fixing the box to the wall stud by screws or bolts is time consuming. Fixing the box to the stud with nails does not necessarily securely mount it.

After the receptacle box is fixed to the stud, drywall or plasterboard or paneling is installed to form a wall. A hole must be formed in the wallboard at the location of the receptable box. This requires accurate and time consuming measurement. If the hole is slightly devient from the opening of the receptacle box, it must be repaired for the sake of appearance.

The invention relates to an electrical receptacle box that is quickly and easily installed on a wall stud positioned to be covered by wallboard, and a method of accurately and quickly forming an opening in the wallboard and installing the electrical receptacle. The receptacle box includes a box-like housing formed of side walls and a back wall and having a front opening defined by the forward edges of the side walls. A hollow tubular mounting stem extends from one of the side walls and is threaded at its outer end. The mounting stem is adapted to be inserted through a hole formed in the wall stud with the outer end extending through the opposite side of the wall stud and with one side wall of the box housing closely in contact with the wall stud. A coupler is threaded on the outer end of the mounting stem to firmly secure the box housing to the wall stud.

A cantilevered ear extends a short distance diagonally inward from each interior corner of the housing. The ears are recessed with respect to the front opening of the box housing and are positioned to receive legs of a mounting ring. A mounting ring is adapted to closely fit in the front opening of the housing and has legs which bear upon the ears. Aligned threaded openings are provided in the mounting ring and in the ears for fastening the mounting ring to the housing with suitable screws or bolts. The mounting ring provides for the mounting of electrical receptacles to the housing.

In terms of a method, the receptacle box housing is mounted on a wall stud and electrical conduit is trained through the coupler and through the mounting stem into the interior of the housing. The mounting ring is assembled to the housing. Wallboard is installed on the wall stud and a next adjacent stud, covering the receptacle box. A workman notes the approximate position of the front opening of the housing and forms a hole within the boundaries of the housing opening defined by the forward edges of the sidewalls. Then with a routing tool or the like the workman moves the tool to a position where it is intercepted by a side wall of the housing. Then, guided by the interior surfaces of the side walls, the workman moves the tool along the side walls forming an opening in the wallboard corresponding to the front opening of the housing. Since the mounting ears in the housing are recessed, they do not interfere with the path of travel of the cutting tool. Once the opening is formed the interior of the housing is exposed, and the mounting ring can be mounted to the housing. The electrical receptacles are then mounted to the mounting ring and connected to the wires carried by the electrical conduit. A faceplate is installed to complete the work.

IN THE DRAWINGS

FIG. 1 is a front elevational view of a housing of an electrical receptacle box of the invention installed on a wall stud;

FIG. 2 is a sectional view of the electrical outlet box housing of FIG. 1 taken along the line 2—2 thereof;

FIG. 3 is an enlarged view partly in section of the electrical outlet box housing of FIG. 2 taken along the line 3—3 thereof;

FIG. 4 is a perspective view of a portion of an electrical box housing according to the invention;

FIG. 5 is a side elevational view partly in section illustrating a step in the method of installation of the electrical receptacle box of the invention;

FIG. 6 is a front elevational view of the electrical receptacle box and illustrated step of FIG. 5 taken along the line 6—6 thereof;

FIG. 7 is a side elevational view partly in section illustrating another step in the method of installation of an electrical receptacle box according to the invention;

FIG. 8 is a front elevational view of the electrical receptacle box and step of FIG. 7 taken along the line 8—8 thereof;

FIG. 9 is a front elevational view of an electrical receptacle box installed with respect to a wall stud and a wallboard and having electrical receptacles assembled to it;

FIG. 10 is a front elevational view of a completed electrical receptacle box according to the invention assembled with respect to a wall stud and a wall and having electrical receptacles assembled thereto and being covered by a faceplate;

FIG. 11 is an enlarged side sectional view of the mounting ring of the electrical receptacle box assembly of the invention; and FIG. 12 is a perspective view of a second form of coupler for use with the electrical receptacle box of the invention.

DESCRIPTION OF PREFERRED EMBODIMENT

Referring to the drawings, there is shown in FIGS. 1 through 3 a portion of an electrical receptacle box according to the invention indicated generally at 20 mounted on a vertical wall stud 21. Electrical receptacle box 20 includes a box-like housing 22 comprised of perpendicularly orientated side walls 23, 24, 25 and 26 connected to a back wall 28. Housing 22 has a planar, front opening indicated at 29 in FIG. 2 defined by the forward edges of the side walls for access to the interior thereof.

A hollow, tubular mounting stem 30 is centrally connected to one side wall 25 of housing 22 and extends perpendicularly away from the side wall 25. Mounting stem 30 has an interior flange 32 circumscribing an opening in the side wall 25 and fixed to the interior of the side wall 25 as by welding. The main body portion of the mounting stem 30 extends through this opening and terminates in a threaded outer end 33. A horizontal mounting hole 34 is provided through wall stud 21 and is sized to closely accommodate the mid-portion of mounting stem 30. The mid-portion of mounting stem 30 is accommodated in hole 34 with the connecting side wall 25 in snug relationship to one side of the wall stud 21 and the threaded end 33 of mounting stem 30 extending through the opposite side of wall stud 21. A tubular coupler 36 has an interiorly threaded end which is threaded onto the outer end 33 of mounting stem 30 and is in bearing relationship to the opposite side of wall stud 21 to firmly hold the housing 22 and mounting stem 30 in place. As shown in FIG. 2, mounting opening 34 of wall stud 21 is positioned so as to locate the front opening 29 of housing 22 substantially coplanar with the front face of the wall stud 21. Adaptor 36 has a hexagonal or nut-shaped end portion 37 engagable by a wrench to be turned so to securely draw in the housing 22 with respect to the wall stud 21. The side wall 25 disposed adjacent wall stud 21 includes means to prevent rotation of the housing 22 with respect to wall stud 21 once installed thereon. As shown in FIG. 4, an abrasive surface finish is provided by a plurality of pointed cleats 38 disposed on side wall 25 orientated to penetrate or dig into the side surface of wall stud 21 as coupler 36 is tightened. Alternatively, side wall 25 could have a knurled surface as shown at 40 in FIG. 4 or could have an abrasive material affixed to it, or the like to achieve an abrasive surface finish. Coupler 36 has an annular flange 41 disposed on the end which is in contact with wall stud 21. A brad 42 on a bendable arm is fixed to the flange 41. Once the coupler 36 is in place with respect to the wall stud 21, the brad 42 can be pounded into the wall stud 21 in order to securely position the coupler 36.

Coupler 36 has set screws 44 threaded through the side wall thereof to hold in place a length of electrical conduit 45. The conduit 45 is trained through the coupler 36 and through the mounting stem 30 into the housing 22 and carries the usual electrical wiring 46 for connection to an electrical receptacle. Back wall 28 of housing 22 has the conventional knock-out members 48 for conventional introduction of the electrical conduit into the housing. In the event that the electrical conduit is introduced into the housing through the opening left by removal of one of the knock-out members 48, then coupler 36 is not used to secure the receptacle box 20 to the wall stud 21, but rather an end cap 49 is employed as shown in FIG. 12. End cap 49 is closed and has interior threads to engage the threaded end 33 of mounting stem 30 to tightly pull the housing 22 up against the side of the wall stud 21. End cap 49 has a hexagonal nut-shaped portion 50 for engagement by a wrench.

Ears 52 extend diagonally inward a short distance from each of the interior corners of housing 22. Ears 52 are coplanar to one another and, as shown in FIG. 2, are recessed relative to front opening 29. Each ear 52 forms a flat platform recessed relative to opening 29 and has a threaded hole 53. As shown in FIG. 4, ears 52 can be formed by being stamped from a portion of the housing side wall. A mounting ring 55, shown in FIGS. 7, 8 and 11, is adapted for assembly to the housing 22 to mount an electrical receptacle. Mounting ring 55 is rectangular in conformance with the shape of front opening 29 of housing 22. Mounting ring 55 comprises a rectangular open frame 56 having legs 57 extended from the corners thereof. Legs 57 are adapted to land upon or engage the ears 52 when mounting ring 55 is assembled to the receptacle box housing 22. Openings 58 are provided in the frame 56 of mounting ring 55 aligned with the threaded holes 53 in the ears 52 when the mounting ring 55 is assembled in the housing 22. Bolts 60 pass through the openings 58 of mounting ring 55 and are threaded into the holes 53 of the ears 52 to secure the mounting ring 55 with respect to the electrical receptacle box housing 22. Mounting ring 55 has a plurality of intermediately disposed holes 61 sized and spaced to accept and mount conventional electrical receptacles.

The legs 57 of mounting ring 55 can be shortened as the need may be. For example, the wall stud 21 may be slightly askew, or the housing 22 might be mounted with respect to the wall stud 21 at a slight angle. By shortening selected legs of the mounting ring 55, the planar face of mounting ring 55 can be adjusted so as to be flush. The legs 57 of mounting ring 55 are scored and through the use of a pair of pliers, or wire cutters as indicated at 62 in FIG. 11, end portions of the legs 57 can be selectively removed to achieve the desired leg length.

In terms of a method, a transverse mounting hole 34 is formed in a wall stud 21 at a location to properly position the housing 22 of receptacle box 20. Housing 22 is assembled to wall stud 21 by inserting mounting stem 30 through the mounting hole 34 and affixing the coupler 36 to the threaded end 33 of mounting stem 30 with front opening 29 of housing 22 facing forward. A wrench can be used to tighten the coupler 36 whereby the housing 22 is quickly and easily assembled to the wall stud 21. Conduit 45 is trained through coupler 36 and secured by set screws 44. Wallboard 64, shown in FIGS. 5 and 6, is then installed in conventional fashion as by being nailed to wall stud 21 and the next adjacent wall stud (not shown) covering the housing 22. Wallboard 64 can be plaster board, plywood, paneling or the like. The workman knows the approximate location of the front opening 29 of housing 22 and with a suitable tool such as a drill, forms an opening through the wallboard 64 into the front opening 29 of housing 22 centrally thereof, as indicated at 65 in FIG. 6. With an appropriate tool such as a router, or a routing bit 66 mounted in an electric hand drill 68, the workman makes a cut from the hole 65 to the interior edge of one of the side walls of housing 22. The workman then moves the cutting tool around the periphery of opening 29 being guided by the interior surfaces of side walls 23 through 25 of housing 22, making a cut indicated at 69 in FIG. 6. As shown in FIG. 5, the ears 52 in housing 22 are recessed sufficiently such that cutting tool 66 does not contact them. Upon completely cutting around the interior periphery of opening 29 defined by the inner surfaces of the side walls, the segment 64A of wallboard 64 that had covered opening 29 is removed leaving an opening in the wallboard 64 in substantial conformance with the opening 29 of the housing 22. The need for prior estimating on the part of the workman is eliminated and repair to the wallboard 64 necessitated by inaccurate estimates of the proper location of the opening is eliminated.

Next the mounting ring 55 is assembled to the electrical receptacle box housing 22. The legs 57 are positioned in contact with the ears 52 and bolts 60 are used to fasten the mounting ring 55 as previously described. Prior to mounting the mounting ring 55 to the housing 22, the legs 57 can be shortened as may be necessary to account for any angularity of the mounting of the receptacle box housing 22 or in order to position the outer planar face of mounting ring 55 in flush relationship with the wallboard 64. After the mounting ring 55 is installed, electrical receptacles are mounted to the mounting ring 55 in conventional fashion. As shown in FIG. 9, a pair of light switches 70 are mounted to the mounting ring 55 and connected to the wiring 46 in usual fashion. A face plate 71 is finally installed by screws 73 to the switches 70 covering the mounting ring 55 and the peripheral edges of the hole formed in the wallboard 64 to complete the installation.

While there has been shown and described one embodiment of an electrical receptacle box according to the invention, it will be apparent to those skilled in the art that some deviation may be had from the electrical receptacle box and method shown and described without departing from the scope and spirit of the appended claims.

The embodiments of the invention in which an exclusive property or privilege is claimed are defined as follows:

1. An electrical receptacle mounting box mountable to an upright wall stud having a transverse, horizontal mounting hole and having a front face for installation of wallboard, said mounting box comprising:

a housing having a back wall and side walls connected to the back wall with forward edges defining a planar front housing opening;

a hollow tubular mounting stem open to the interior of the housing connected at one end to a first housing side wall and extending away therefrom in perpendicular relationship to the first side wall adapted to be inserted through the transverse hole formed in the wall stud with the outer end of the mounting stem extending from a side of the wall stud opposite the housing, said tubular member connected to said first side wall at a location to locate the planar front housing opening substantially coplanar with the front face of the wall stud when inserted in the transverse hole formed in the wall stud, said outer end of the mounting stem having a first threaded portion, said tubular stem adapted to carry a length of electrical conduit for introduction of electrical wiring into the housing;

a tubular coupler having a second threaded portion for assembly to the outer end of the mounting stem when the mounting stem is inserted through the transverse hole in the wall stud to secure the housing with respect to the wall stud;

a plurality of coplanar ears in said housing extended inwardly from the side walls of said housing and recessed relative to the housing front opening an amount sufficient to be cleared by a cutting tool being used to form an opening in a wallboard installed on the front face of the stud in covering relationship to the housing in substantial conformance with the planar front housing opening; and means on the housing for mounting an electrical receptacle including a mounting ring at least partially insertable in said planar front housing opening, said mounting ring comprising an open frame and a plurality of legs, said legs adapted to bear upon the ears in the housing when the mounting ring is assembled to the housing, and means for fixing the mounting ring to the housing.

2. The electrical receptacle mounting box of claim 1 including: an abrasive surface finish on the housing side wall connected to the mounting stem.

3. The electrical receptacle mounting box of claim 1 or 2 including: set screws threaded into the coupler to contact and hold a length of electrical conduit trained through the coupler and mounting stem.

4. The electrical receptacle mounting box of claim 1 wherein: means for fixing the mounting ring to the housing includes a plurality of bolts extended through the frame of the mounting ring and threaded into the ears in the housing.

5. An electrical receptacle mounting box mountable to an upright wall stud having a front face for installation of wallboard, comprising:

a housing having a back wall and side walls connected to the back wall with forward edges defining a planar front housing opening;

means to mount the housing to the wall stud with the planar front housing opening substantially coplanar with the front face of the wall stud;

a plurality of coplanar ears located in the housing extending centrally inward from the side walls of the housing and being recessed relative to the front opening an amount sufficient to be cleared by a cutting tool being used to form an opening in a wallboard installed on the front face of the stud in covering relationship to the housing in substantial conformance with the planar front housing opening;

a mounting ring for mounting an electrical receptacle, said mounting ring including an open frame shaped in conformance with the planar front opening of the housing and a plurality of legs, one leg corresponding to each ear, said legs insertable into the front opening of the housing to bear upon the ears in the housing; and means to fasten the mounting ring to the housing.

6. The electrical receptacle mounting box of claim 5 wherein: said means to mount the housing to a wall stud includes a mounting stem connected to a side wall of the housing and extended therefrom adapted to be inserted through a transverse hole in a wall stud, said mounting stem having a threaded outer end extendable from a side of a wall stud opposite the housing when the mounting stem is inserted in a transverse hole in a wall stud, said tubular stem adapted to carry a length of electrical conduit for introduction of electrical wiring into the housing, and a tubular coupler having a threaded portion for assembly to the outer end of the mounting stem when the mounting stem is inserted through a transverse hole in a wall stud to secure the housing with respect to the wall stud.

7. The electrical receptacle mounting box of claim 6 wherein: means to fasten the mounting ring to the housing includes a plurality of bolts passing through holes in the frame of the mounting ring and threaded into threaded openings located in the ears.

8. The electrical receptacle mounting box of claim 6 including: an abrasive surface finish on the side wall connected to the mounting stem to inhibit rotation of the housing when it is mounted to a wall stud.

9. A method of installation of an electrical receptacle box of the type having a housing having a back wall and side walls connected to the back wall with forward edges defining a planar front housing opening, a plurality of coplanar ears located in the housing extending centrally inward from the side walls of the housing and being recessed relative to the front opening an amount sufficient to be cleared by a cutting tool being used to form an opening in a wallboard installed on the front face of the stud in covering relationship to the housing in substantial conformance with the planar front housing opening, a mounting ring for mounting an electrical receptacle, said mounting ring including an open frame shaped in conformance with the planar front opening of the housing and a plurality of legs, one leg corresponding to each ear, said legs insertable into the front opening of the housing to bear upon the ears in the housing, and means to mount the housing to a wall stud including a mounting stem connected to a side wall of the housing and extended therefrom adapted to be inserted through a transverse hole in a wall stud, said mounting stem having a threaded outer end extendable from a side of a wall stud opposite the housing when the mounting stem is inserted in a transverse hole in a wall stud, said tubular stem adapted to carry a length of electrical conduit for introduction of electrical wiring to the housing, and a tubular coupler having a threaded portion for assembly to the outer end of the mounting stem when the mounting stem is inserted through a transverse hole in a wall stud to secure the housing with respect to the wall stud, comprising the steps:

providing an upright wall stud with a transverse hole;

assembling the housing to the wall stud by inserting the stem through the hole on one side of the wall stud and assembling the coupler to the outer end of the mounting stem on the opposite side of the wall stud with the forward opening of the housing facing forward;

installing wallboard on the wall stud in covering relationship to the front opening of the housing;

forming a hole in the wall board within the boundaries of the forward edges of the side walls of the housing defining a front opening;

with a wallboard cutting tool, cutting from the hole formed in the wall board to an inner edge of the side wall and then cutting an opening in the wallboard corresponding to the front opening of the housing by following along the inner edges of the side walls of the housing with the cutting tool; and assembling the mounting ring to the housing.

10. The method of claim 9 including the step of introducing electrical wiring into the housing by training electrical conduit through the coupler and through the mounting stem prior to the step of installing the wallboard.

* * * * *